(12) United States Patent
Genolet et al.

(10) Patent No.: US 6,554,070 B2
(45) Date of Patent: Apr. 29, 2003

(54) COMPOSITION AND METHOD FOR SEALING AN ANNULAR SPACE BETWEEN A WELL BORE AND A CASING

(75) Inventors: Luis Carlos Genolet, Los Teques (VE); Juan Carlos Chavez, Caracas (VE); Douglas Espin, Caracas (VE); Marie Alejandra Jimenez, Caracas (VE)

(73) Assignee: Intevep, S.A., Caracas (VE)

(*) Notice: Subject to any disclaimer, the term of this patent is extended or adjusted under 35 U.S.C. 154(b) by 0 days.

(21) Appl. No.: 09/809,871

(22) Filed: Mar. 16, 2001

(65) Prior Publication Data
US 2002/0129939 A1 Sep. 19, 2002

(51) Int. Cl.[7] .................. E21B 33/13; E21B 33/14; C04B 14/00
(52) U.S. Cl. .................. 166/292; 166/293; 507/906; 106/287.34; 106/482; 106/816
(58) Field of Search .................. 166/292, 293, 166/300, 285; 507/139, 266, 277, 906; 106/33, 38.2, 287.34, 311, 482, 632, 816, 817

(56) References Cited

U.S. PATENT DOCUMENTS

| | | | | |
|---|---|---|---|---|
| 3,998,269 A | * | 12/1976 | Lybarger | 166/250.14 |
| 4,176,720 A | * | 12/1979 | Wilson | 106/694 |
| 4,696,698 A | * | 9/1987 | Harriett | 106/624 |
| 4,730,675 A | * | 3/1988 | Wygant et al. | 166/294 |
| 4,948,428 A | * | 8/1990 | Liao | 106/628 |
| 5,038,863 A | * | 8/1991 | Bloys et al. | 166/291 |
| 5,351,757 A | * | 10/1994 | Chou et al. | 166/270 |
| 5,398,758 A | * | 3/1995 | Onan et al. | 166/292 |
| 5,411,092 A | * | 5/1995 | Cowan | 106/790 |
| 5,476,142 A | * | 12/1995 | Kajita | 106/803 |
| 6,152,227 A | * | 11/2000 | Lawson et al. | 166/293 |

FOREIGN PATENT DOCUMENTS

| | | |
|---|---|---|
| WO | 98/22648 | 5/1998 |

* cited by examiner

*Primary Examiner*—David Bagnell
*Assistant Examiner*—Daniel P Stephenson
(74) *Attorney, Agent, or Firm*—Bachman & LaPointe, P.C.

(57) ABSTRACT

A method for sealing an annular space between a bore hole and a casing includes the steps of: providing a fluid sealing system comprising a particulate material and a bonding agent; positioning the fluid sealing system in the annular space whereby the particulate material adheres to walls of the bore hole and the casing; and curing the fluid sealing system so as to form a solid seal in the annular space.

18 Claims, 1 Drawing Sheet

COMPOSITION AND METHOD FOR SEALING AN ANNULAR SPACE BETWEEN A WELL BORE AND A CASING

BACKGROUND OF THE INVENTION

The invention relates to a method and composition for sealing well bores and, more particularly, for sealing the annular space between a bore hole and a casing positioned in the bore hole.

During the completion of a subterranean well, especially a hydrocarbon producing or injection well, a casing is positioned within the well after drilling so as to provide a conduit through which fluids can be transported. Conventionally, the casing is cemented in place by positioning a cement material in the annular space to provide an annular seal between the casing and the geological strata through which the bore has been drilled to support the bore and the casing.

Conventional cement materials used for such sealing suffer from loss of integrity due to chemical attack, high temperature and/or fluids encountered in the well environment. Further, cement slurry is subject to incomplete seal with the bore hole and casing, and can frequently allow fluid migration or channeling which interferes with the effective seal which is needed. In addition, high curing time is required.

Further, once the cement has fully set, it is a substantially rigid structure, and is susceptible to damage should the environment in which it positioned experience any shifting and the like.

It is clear that the need remains for an improved method and composition for sealing well bores.

It is therefore the primary object of the present invention to provide a method and composition for sealing well bores and annular spaces within such wells which avoids the above problems.

It is a further object of the present invention to provide such a method and composition which does not result in substantially increased cost.

It is still another object of the present invention to provide such a method and composition which can be disposed in conventional wells using conventional equipment.

Other objects and advantages of the present invention will appear herein below.

SUMMARY OF THE INVENTION

In accordance with the present invention, the foregoing objects and advantages have been readily attained.

According to the invention, a method is provided for sealing an annular space between a bore hole and a casing, which method comprises the steps of providing a fluid sealing system comprising a particulate material and a bonding agent; positioning the fluid sealing system in the annular space whereby the particulate material adheres to walls of the bore hole and the casing; and curing the fluid sealing system so as to form a solid seal in the annular space.

According to the invention, a composition is also provided for use in sealing bore holes and annular spaces, which composition comprises a fluid sealing system containing a particulate material and a bonding agent, wherein said bonding agent is activatable to bond particles of said particulate material and form a solid seal.

The composition and method in accordance with the present invention provide a system which adheres to walls of the well bore and casing and thereby provides greater integrity of the seal, with significantly reduced chance for fluid migration, channeling and the like. Further, the method and composition of the present invention provide a more flexible final structure, which is less susceptible to damage due to geographical shifting and the like, and the composition can be provided at comparable cost to conventional cement.

BRIEF DESCRIPTION OF THE DRAWINGS

A detailed description of preferred embodiments of the present invention follows, with reference to the accompanying drawings, wherein.

DETAILED DESCRIPTION

Figure 1:
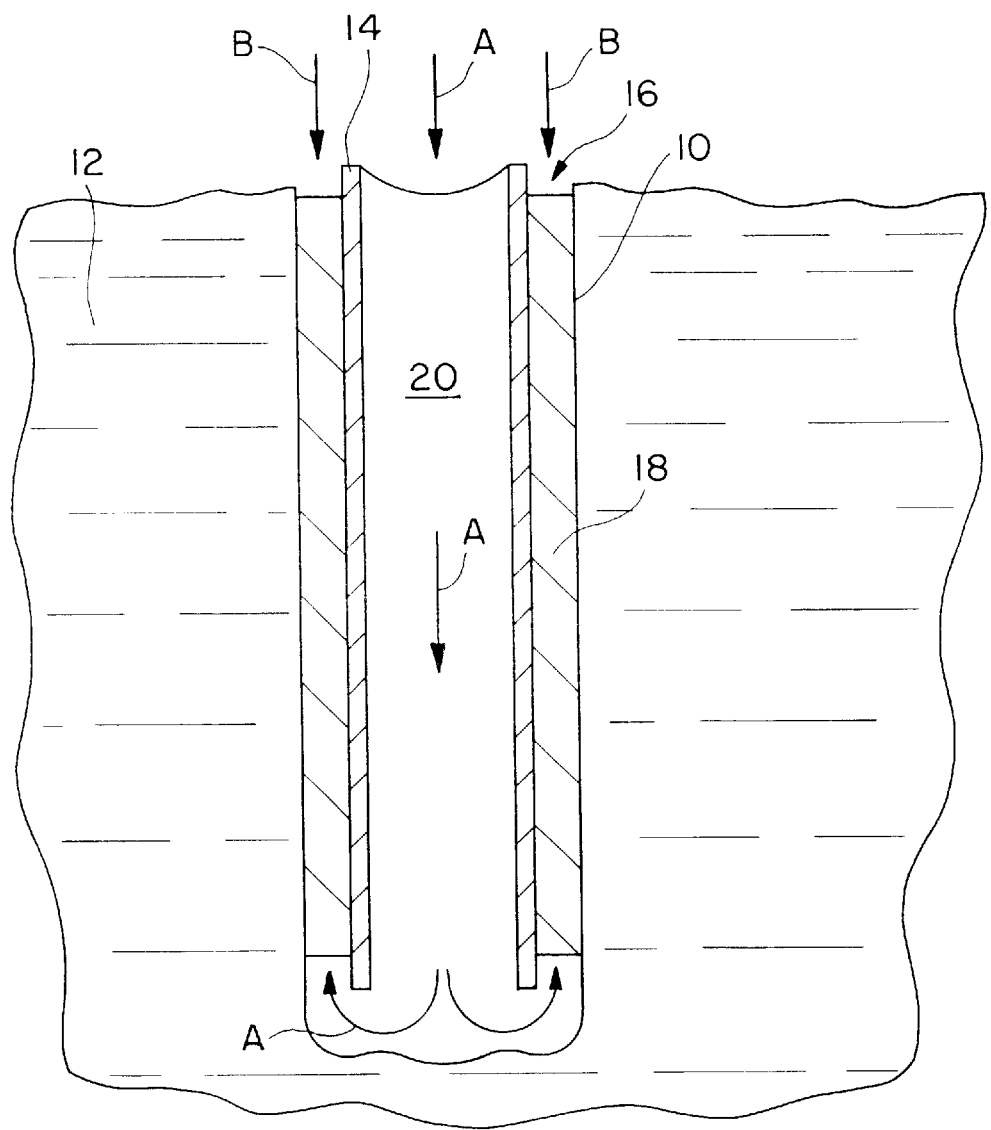
FIG. 1 illustrates an environment of use and several aspects of the method of the present invention.

The invention relates to a method and composition for sealing well bores, especially for sealing annular spaces between a bore hole and a casing.

As set forth above, subterranean wells such as hydrocarbon producing and/or injection wells typically require a casing to be positioned within the well bore to provide a conduit for transportation of fluids, and this casing must be cemented in place within the hole. In accordance with the present invention, a composition is provided which can advantageously be positioned within the annular space defined between the well bore or bore hole and the casing so as to provide a reliable solid seal with improved characteristics as compared to conventional cement.

FIG. 1 shows a typical embodiment of use wherein a bore hole 10 has been drilled through subterranean formations 12, and a casing 14 positioned within bore hole 10.

The present invention is directed toward a sealing composition and method which is ideally used for sealing an annular space 16 defined between the walls of bore hole 10 and the outer surface of casing 14. FIG. 1 shows a solid seal 18 positioned in annular space 16 as desired.

According to the invention, annular seal 18 can be obtained by pumping the suitable composition through an inner space 20 of casing 14 such that the fluid flows through the inner space of casing 14, out of the bottom of casing 14 at the bottom of the hole, and up through annular space 16 as shown by arrows A in FIG. 1.

Alternatively, a suitable composition can be disposed directly into annular space 16, for example as illustrated by Arrow B in FIG. 1.

In accordance with the present invention, the composition for obtaining the desired seal is advantageously a fluid sealing system which includes a particulate material and a bonding agent which can be activated so as to cure and bond particles of the particulate material together to form the desired solid seal.

In further accordance with the invention, the fluid sealing system, which comprises a particulate material and a liquid phase bonding agent, may advantageously be provided with an activating agent that serves to maintain the fluid nature of the particulate material/bonding agent system during pumping, and further serves to accelerate solidification of this system during curing. The activating agent is a pH modifying agent which adjusts the pH toward basic.

According to the invention, the particulate material is preferably a lithic material, for example a material selected from the group consisting of sand, silt, clay and the like. The lithic material may comprise debris from the formation resulting from the well drilling process. The particulate material comprises particles having an average particle size of between about 0.5 microns to 500 microns. In accordance with the present invention, the particulate material advantageously adheres to walls of the well bore and the outer surface of the casing during fluid pumping, thereby advantageously inhibiting fluid migration into the annular space and channeling or other undesirable occurrences while the fluid is curing.

The particulate material can suitably be particles of the desired size of any suitable material. In this regard, the material is preferably selected so as to provide a material which can mechanically stabilize the well while nevertheless being compatible with the formations and fluids encountered in the well bore. Further, in accordance with one preferred aspect of the present invention, the particulate material can be obtained by breaking up or otherwise crushing cuttings obtained during the drilling of the well. In this way, the particulate material is a lithic material formed from rock encountered in the specific well to the sealed. This helps to insure compatibility of the particulate material with the well and other geological surroundings.

The bonding agent is preferably a liquid phase having nanoparticles suspended therein and may, advantageously, be provided as an alcohol/acid suspension of nanoparticles. Suitable alcohol/acid suspensions include methanol/HCl, ethanol/HCl, methanol/$H_2SO_4$ and the like. The nanoparticles of the present invention are provided having an average particle size of between about 1 nanometer ($10^{-9}$ m) (nm) and about 200 nanometers ($10^{-9}$ m) (nm). The nanoparticles may be formed of molecules of organic and inorganic components. The inorganic component has an affinity for the lithic material and the geological surroundings of the formation. Thus, $SiO_2$, for example, is suitable as the inorganic compound, particularly, silica and/or quartz. The organic component allows for polymerization bonding of the inorganic component to the contacting lithic material and the geological surroundings of the formation under certain pH conditions as explained hereinbelow. Suitable organic components include, for example, silanes, hydroxyls and/or alkaloids. Suitable nanoparticle materials for use in the method of the present invention include those disclosed in PCT/EP97/06370 published May 28, 1998. The bonding agent serves as a nanobinder in that, upon curing, the bonding agent serves to bond of the particulate material so as to help set up a solid structure as desired. The polymerization bonding of the nanoparticles described above is substantially nil under acidic conditions. The bonding process will take place over time at a neutral pH environment. The bonding and curing process can be accelerated by injecting water after the consolidation fluid. Further acceleration is obtained by altering the pH of the system to basic. The alcohol/acid suspension further serves to help clean surfaces of the well bore and casing so as to provide for a desirable seal against same.

The particulate material and bonding agent are present in the fluid sealing system at a ratio by weight of particulate material to bonding agent of between about 8.5:1 to about 9.5:1.

The fluid bonding agent and particulate material may suitably be mixed to form the sealing system.

The composition of the present invention is advantageously utilized to form a solid seal in the annular space of a well by positioning the fluid system in the annular space through any known method, for example using either method as illustrated in FIG. 1. Once the system is in place, the system is cured and allowed to solidify, and this is preferably carried out by modifying the pH of the system to a base so as to accelerate the desired solidification. The system pH may be adjusted, for example, by injection of $H_2O$, a base solution of NaOH in $H_2O$ or any other pH modifying additive.

Once the solid seal has sufficiently cured, any further actions may be taken on the well, for example perforation through the annular seal to a geographical formation of strata from which production is desired, and the well can then be produced and/or injected as desired.

The solid seal formed in accordance with the present invention has a permeability of less than or equal to about 1 md. Accordingly, the solid seal is reliable in preventing fluid migration from undesirable formations.

Still further, the solid seal has a compressive strength of at least about 800 psi, thereby making the solid seal ideal for use in annular spaces of subterranean wells.

It should be readily appreciated that a method and composition have been provided in accordance with the present invention which advantageously allow for improvements over the use of conventional cement in sealing annular spaces and other well bore environments. The composition of the present invention provide advantages in terms of adhesion and seal integrity, as well as flexibility. Further the cost of the composition in accordance with the present invention is roughly the same as the cost of conventional cement such as type B and type H cement.

The increased adhesion of particulate material to the casing surface and formation walls reduces the possibility of fluid canalization which could result in unwanted production from undesirable zones or formations through which the well has been drilled. This also serves to help prevent formation fluid crossover due to pressure differential.

The particulate material is selected according to each particular application, preferably to be compatible with formation fluids, and to provide a sufficient degree of flexibility which reduces the risk of fracturing.

Also, as set forth above, the use of a bonding agent including an alcohol/acid suspension allows the formation walls and casing surface to be cleaned up as a preliminary step, before curing, to provide better quality seals.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for sealing an annular space between a bore hole and a casing, comprising the steps of:
   providing a fluid sealing system comprising a particulate material and a bonding agent comprising an alcohol-acid suspension of nanoparticles;
   positioning said fluid sealing system in said annular space whereby said particulate material adheres to walls of said bore hole and said casing; and
   curing said fluid sealing system so as to form a solid seal in said annular space.

2. The method according to claim 1, wherein said system further comprises an activating agent for maintaining fluid state of said system during said positioning step and for accelerating solidification of said fluid during said curing step.

3. The method according to claim 2, wherein said activating agent comprises a basic pH modifying agent.

4. The method according to claim 1, wherein said particulate material comprises lithic material.

5. The method according to claim 1, wherein said particulate material has an average particle size of less than or equal to about 500 microns.

6. The method according to claim 1, further comprising the steps of:

obtaining cuttings from drilling said bore hole; and breaking up said cuttings so as to provide said particulate material.

7. The method according to claim 1, wherein said particulate material comprises particles of a material selected from the group consisting of sand, silt, clay and combinations thereof.

8. The method according to claim 1, wherein said bonding agent and said particulate material are present at a ratio by weight of particulate material to bonding agent of between about 8.5:1 and about 9.5:1.

9. The method according to claim 1, wherein said curing step bonds said bonding agent between particles of said particulate material and the walls of said bore hole.

10. The method according to claim 1, wherein said curing step comprises changing pH of said system so as to solidify said system.

11. The method according to claim 1, wherein said solid seal has a permeability of less than or equal to about 1 md.

12. The method according to claim 1, wherein said solid seal has a compressive strength of at least about 800 psi.

13. A composition for sealing bore holes, comprising a fluid sealing system containing a particulate material ad a bonding agent comprising an alcohol-acid suspension of nanoparticles, wherein said bonding agent is activatable to bond particles of said particulate material and form a solid seal.

14. The composition of claim 13, wherein said system further comprises an activating agent for maintaining fluid state of said system during said positioning step and for accelerating solidification of said fluid during said curing step.

15. The composition of claim 14, wherein said activating agent comprises NaOH.

16. The composition of claim 13, wherein said particulate material comprises lithic material.

17. The composition of claim 13, wherein said particulate material has an average particle size of less than or equal to about 500 microns.

18. The composition of claim 13, wherein said particulate material comprises particles of a material selected from the group consisting of sand, silt, clay and combinations thereof.

* * * * *